United States Patent

Sakaki

[11] 3,884,087
[45] May 20, 1975

[54] DRIVE ASSEMBLY FOR ROTARY HEAT REGENERATOR

[75] Inventor: Yoshihiro Sakaki, Yokohama, Japan

[73] Assignee: Nissan Motor Company Limited, Yokohama, Japan

[22] Filed: Dec. 19, 1973

[21] Appl. No.: 426,019

[30] Foreign Application Priority Data
Dec. 21, 1972 Japan............................... 47-128414

[52] U.S. Cl...................... 74/63; 64/15 B; 403/109
[51] Int. Cl............................................ F16h 21/12
[58] Field of Search........... 74/63; 64/15 B; 403/109

[56] References Cited
UNITED STATES PATENTS

| | | | |
|---|---|---|---|
| 1,692,978 | 11/1928 | Dunham | 64/15 B |
| 2,158,847 | 5/1939 | Baumann | 64/15 B |
| 2,753,762 | 7/1956 | Dorgelys | 403/109 X |
| 2,882,473 | 4/1959 | Warren | 74/63 |
| 2,971,355 | 2/1961 | Walsh | 64/15 B |
| 3,239,255 | 3/1966 | Murcott | 403/109 |

OTHER PUBLICATIONS

Merriman, A Dictionary of Metallurgy, 1958.

Primary Examiner—Wesley S. Ratliff, Jr.

[57] ABSTRACT

Generally parabolic plate springs disposed in adjacent recesses in a cylindrical heat accumulator and an outwardly, concentric annular drive member provide driving connection therebetween and absorb vibration and shock loading.

3 Claims, 2 Drawing Figures

DRIVE ASSEMBLY FOR ROTARY HEAT REGENERATOR

This invention relates to a drive assembly for a rotary heat regenerator.

Regenerators or heat exchangers are used in specific types of gas turbine engines for transferring heat from turbine exhaust gas to air leaving a compressor to increase the performance and efficiency of the turbine engine. Such regenerators include heat accumulators by which heat is transferred. Heat accumulators are required to withstand rapid and large temperature changes and to provide a low pressure drop. Heat accumulators are thus usually made of porous materials such as ceramics.

Rotary regenerators are presently under development to provide higher performance and efficiency. Rotary regenerators use rotatable cylindrical heat accumulators, which are driven for rotation relative to the flow of air from the compressor and exhaust gas from the turbine. Some heat accumulators are driven by ring gears which are externally toothed and positioned concentrically around the heat accumulators. Since heat accumulators are made of ceramics or other porous materials which are damaged by mechanical shock and impact, it is important that they be protected therefrom.

It is thus an object of the present invention to provide a drive assembly for a rotary heat regenerator, which is simple in construction and has a large capacity for absorbing vibration and shock loading between a driving member and a heat accumulator.

The above and other objects, features and advantages of the present invention will become clear from the following description taken in conjunction with the accompanying drawings, in which.

Figure 1:
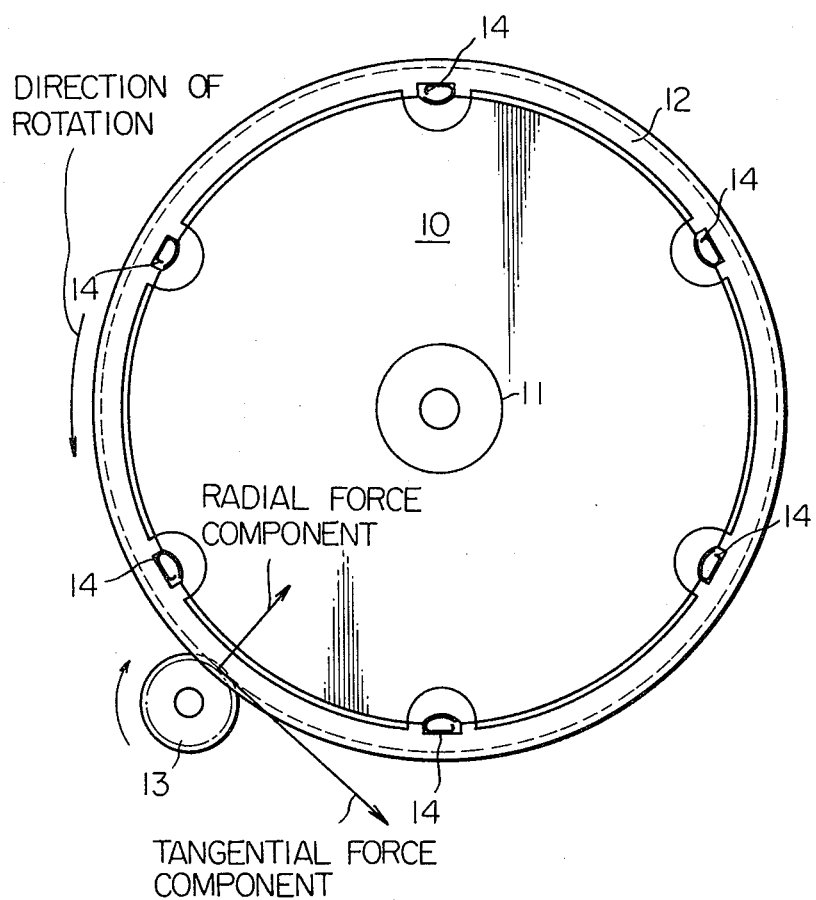
FIG. 1 is an overall plan view of a preferred embodiment of this invention.

In FIG. 1, a drive assembly for a rotary heat regenerator for a gas turbine engine includes a cylindrical heat accumulator 10 rotatably mounted on a shaft 11. The heat accumulator 10 is made of a porous material such as a ceramic to withstand rapid and large temperature changes, as previously discussed. A drive member in the form of an externally toothed ring gear 12 is outwardly concentric with and radially spaced from the circumference of the heat accumulator 10. The ring gear 12 meshes with and is given by a suitable toothed driving element 13 which may be a pinion gear or a chain sprocket, as desired.

Figure 2:
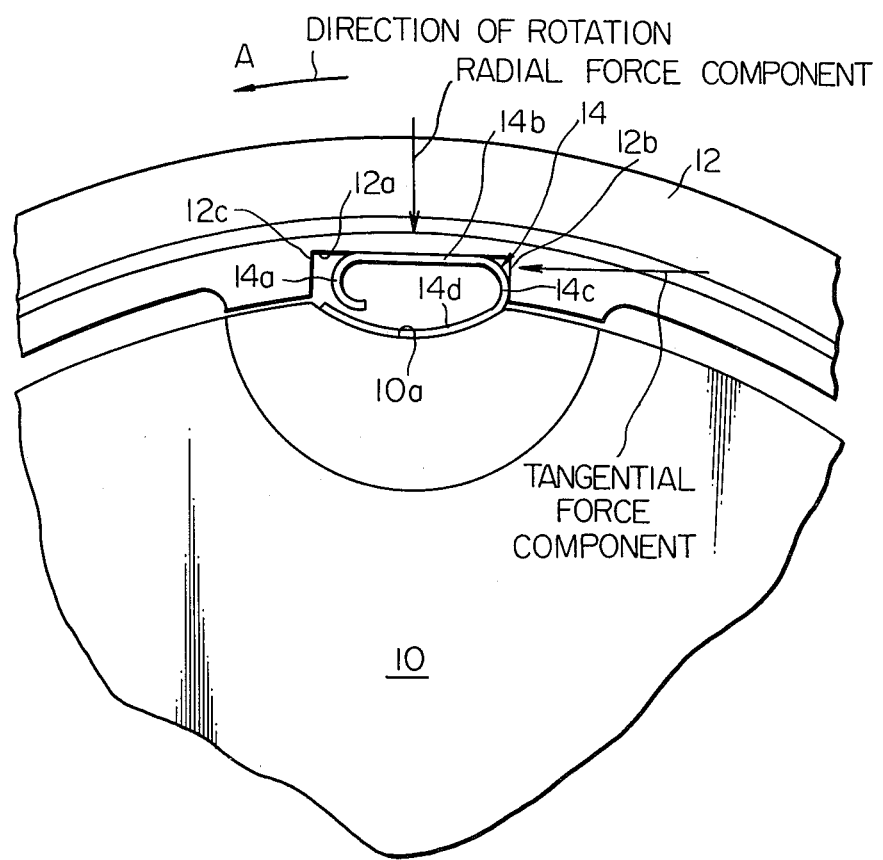
FIG. 2 is a fragmentary plan view showing, on an enlarged scale, details of the embodiment of FIG. 1.

The circumference of the heat accumulator 10 has a plurality of circumferentially equidistantly spaced generally arcuate recesses 10a, one of which is shown in FIG. 2. The inner surface of the ring gear 12, on the other hand, has a plurality of recesses 12a which are radially aligned with the arcuate recesses 10a of the heat accumulator 10. A plate spring 14, preferably made of Inconel-X, is disposed in each space defined by a pair of recesses 10a and 12a.

Although not shown, each plate spring 14, in its free state, has a generally parabolic profile. FIG. 2 shows a spring 14, whose parabolic shape is slightly modified to provide increased performance, as being compressed within a space defined by a recess 10a and a recess 12a.

The generally parabolic profile of the spring 14 includes a vertex 14c and two legs 14b and 14d. As shown, the bottom of the recess 12a of the ring gear 12 is flat, and that of the recess 10a of the heat accumulator 10 is arcuate. The leg 14d of the spring 14 generally retains its parabolic shape to conform to that of the arcuate recess 10a, but the leg 14b is flattened to conform to the flat recess 12a. The leg 14b has an end portion 14a which is curved inwardly toward the vertex 14c. In the normal operating position shown in FIG. 2, the end portion 14a is radially spaced from the leg vertex 14c. The vertex 14c of the spring 14 abuts with an end face 12b of the recess 12a which is oriented forward in a direction of rotation of the ring gear 12 indicated by an arrow A. The legs 14b and 14d of the spring 14 extend in the direction of the arrow A. During operation of the drive assembly, the ring gear 12 is driven through the driving element 13 by suitable means (not shown) in the direction of the arrow A. Tangential driving force is transmitted from the ring gear 12 to the heat accumulator 10 through the end face 12b, vertex 14c and leg 14d, since the plate spring 14 is compressed within the recesses 10a and 12a, so that the heat accumulator 10 is driven at the same speed as and together with the ring gear 12.

If the heat accumulator 10 encounters temporary resistance to rotation or other loading force in a tangential direction as shown in FIG. 2, this can be absorbed by deformation of the leg 14d of the spring 14 to prevent a shock from being transmitted to the heat accumulator 10. In extreme cases, the end portion 14a can also deform in a direction opposite to that of the arrow A if it abuts with an end wall 12c of the recess 12a opposite to the end wall 12b. Radial loading forces can be absorbed by radial deformation of the leg 14d, and in extreme cases by radial deformation of the end portion 14a of the spring 14 if it contacts the leg 14d.

From the foregoing description of a drive assembly of this invention, it will now be understood that its shock absorbing performance is quite high. It is also simple in construction, and will make remarkable contribution to the development of practical gas turbine engines for automotive vehicles.

What is claimed is:

1. A rotary heat regenerator comprising:
   a cylindrical heat accumulator having a plurality of recesses formed in its circumference equidistant from each other;
   an annular drive member having a plurality of recesses, corresponding in numbers to the recesses of said heat accumulator, said annular drive member being outwardly concentric with said cylindrical heat accumulator such that each of the recesses of said annular drive member being in substantial radial alignment with each of the recesses of said cylindrical heat accumulator to form adjacent pairs of recesses;
   a plurality of plate springs, corresponding in numbers to said pairs of recesses, disposed in corresponding spaces, each defined by one of said pairs of recesses, each of said plate springs, in its free state having a generally parabolic profile with an end portion of of one of the legs of the parabolic curved inwardly toward the vertex;
   said plurality of plate springs being disposed in the corresponding spaces and compressed therebetween and spacing said annular drive member radially apart from said heat accumulator;

each of said plate springs being disposed in the corresponding pairs of recesses such that the vertex of the parabolic profile abuts with an end face of each of said recess of said annular drive member which is oriented forward in a direction of rotation of said annular drive member and the other of the legs of the parabolic profile bears against said heat accumulator to provide a driving connection between said drive member and said heat accumulator;

said end portion of said one leg of the parabolic profile of each of said plate springs being radially spaced from the other leg of the parabolic profile and tangentially spaced from an opposite end face of each of said recesses of said drive member which is opposed to said end face and is oriented rearward in the direction of rotation of said drive member to permit deformations of said other leg and said leg of the parabolic profile to absorb a portion of a shock when said heat accumulator encounters temporary resistance to rotation upon being driven by said annular drive member; and said end portion being constructed and arranged such that it deforms to absorb remaining portion of said shock.

2. A rotary heat regenerator as claimed in claim 1, in which said leg of the parabolic profile of each of said plate springs which has its end portion curved inwardly toward the vertex is flattened, and the bottom of each of said recesses of said annular drive member which said one leg contacts is flat.

3. A rotary heat regenerator as claimed in claim 2, in which each of said plate spring has a uniform thickness and made of Inconel-X.

* * * * *